United States Patent [19]

Hirasawa

[11] Patent Number: 5,038,163
[45] Date of Patent: Aug. 6, 1991

[54] CAMERA SYSTEM

[75] Inventor: Masahide Hirasawa, Kanagawa, Japan

[73] Assignee: Canon Kabushiki Kaisha, Tokyo, Japan

[21] Appl. No.: 399,700

[22] Filed: Aug. 28, 1989

[30] Foreign Application Priority Data

Aug. 31, 1988 [JP] Japan .................... 63-216912
Sep. 26, 1988 [JP] Japan .................... 63-242152

[51] Int. Cl.⁵ .............................................. G03B 13/00
[52] U.S. Cl. .................................................. 354/400
[58] Field of Search .............................. 354/400-409, 354/195.12; 350/427-430, 255

[56] References Cited

U.S. PATENT DOCUMENTS 4,816,860 3/1989 Iida ....................................... 354/402
4,825,237 4/1989 Hatase et al. ....................... 354/402

Primary Examiner—L. T. Hix
Assistant Examiner—David M. Gray
Attorney, Agent, or Firm—Robin, Blecker, Daley & Driscoll

[57] ABSTRACT

A camera having a focus detecting circuit for determining the state of focusing of an image of the object on an imaging plane and outputting information for moving an optical system, a memory for storing certain characteristics of the optical system, a control circuit for controlling the movement of the optical system on the basis of the output from the focus detecting circuit, and a correction circuit for correcting the output from the focus detecting circuit on the basis of the information stored in the memory.

52 Claims, 10 Drawing Sheets

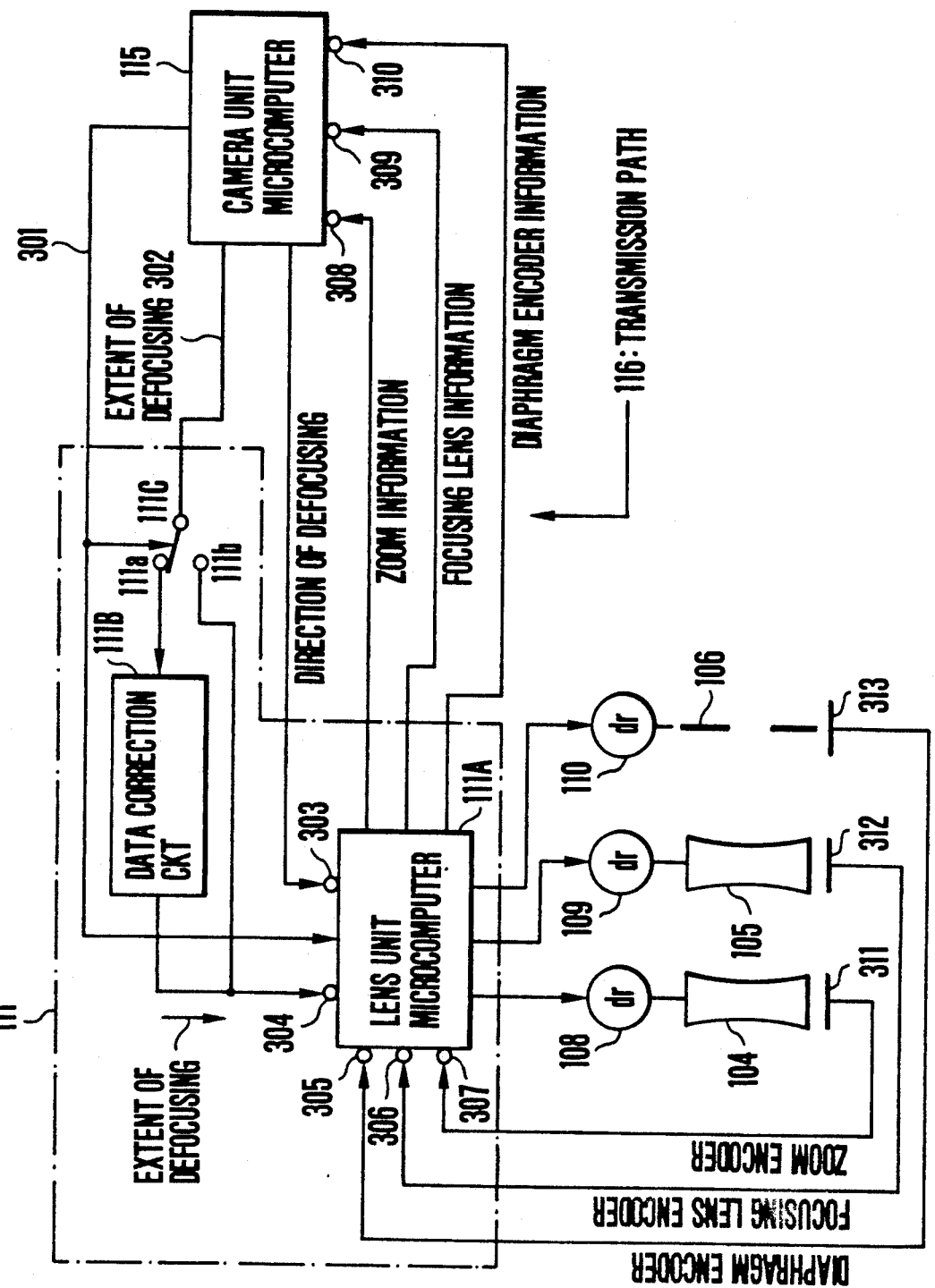

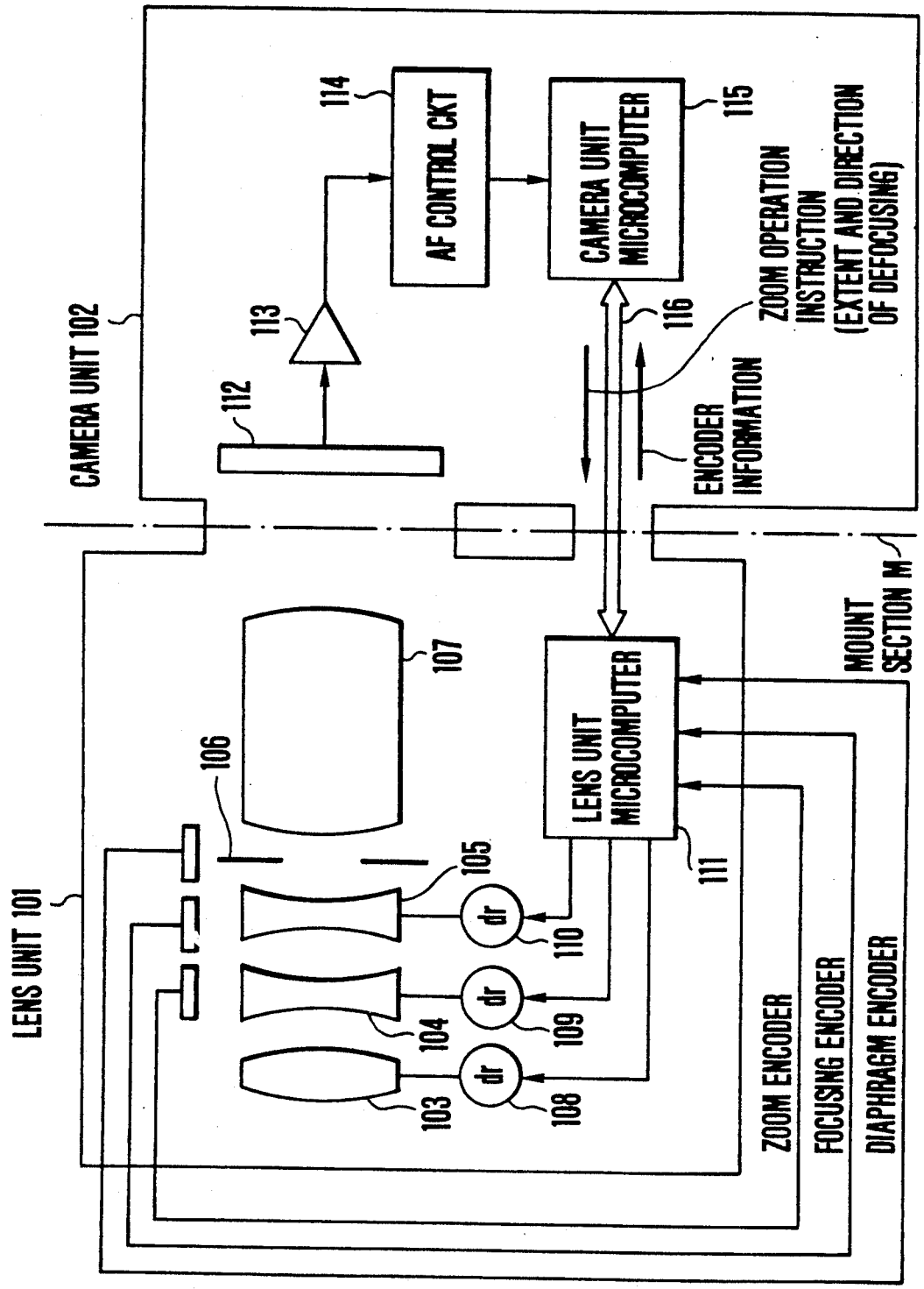

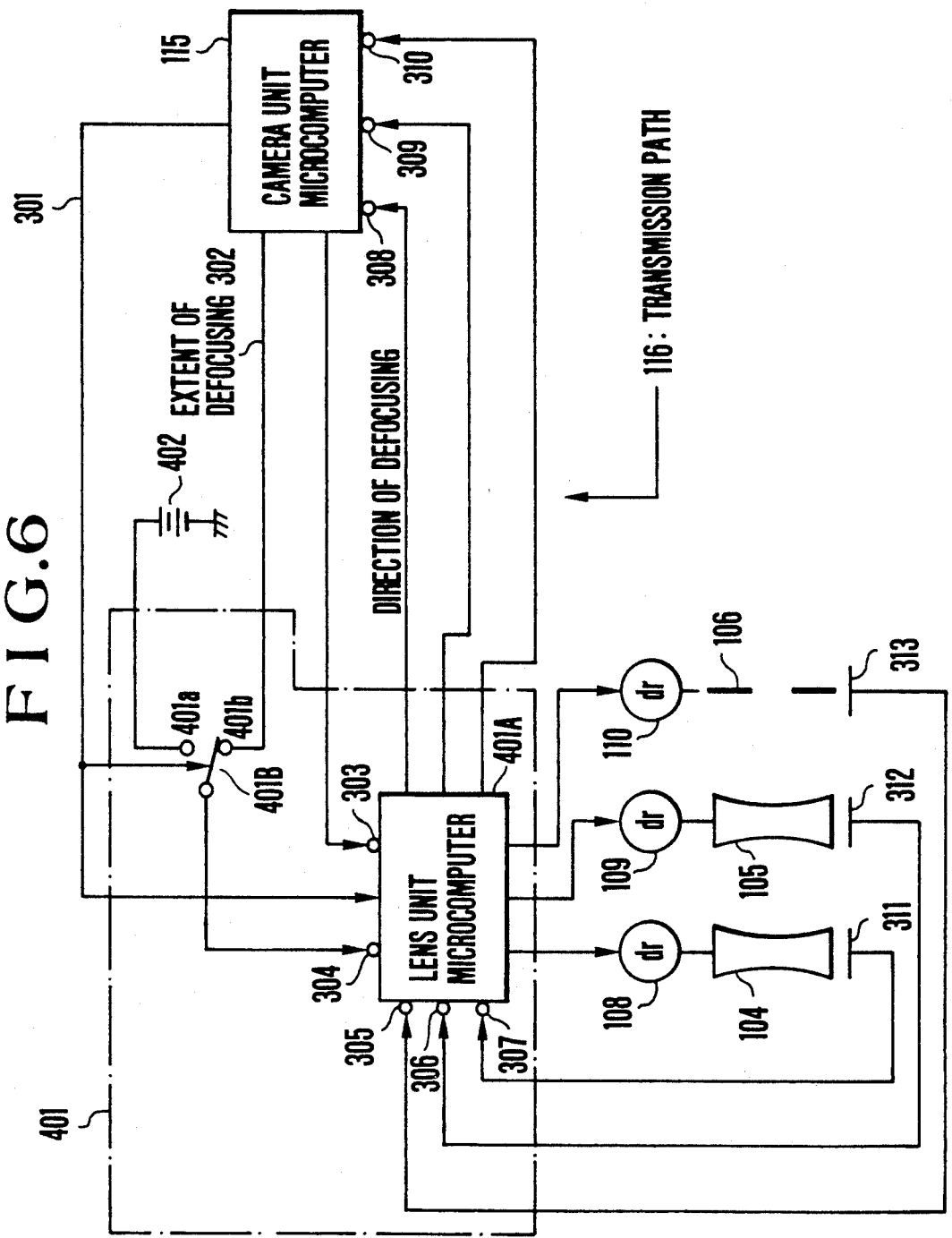

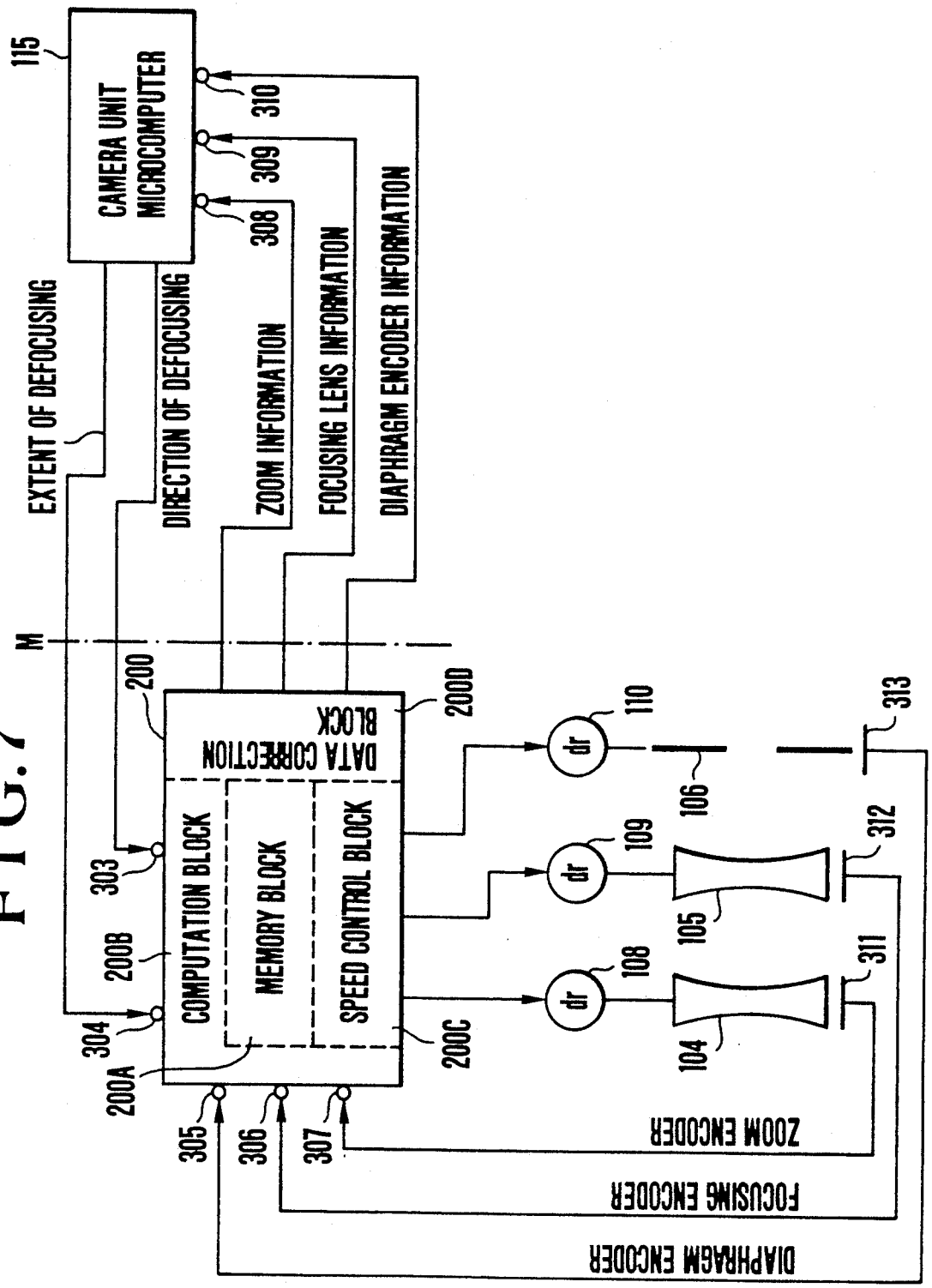

CAMERA SYSTEM

BACKGROUND OF THE INVENTION

1. Field of the Invention

This invention relates to an automatic focusing (hereinafter referred to as AF) system suitable for a video camera system having interchangeable lenses.

2. Description of the Related Art

Recently, varieties of video equipment including video cameras are diffused and increased and video camera systems are accordingly designed to operate with interchangeable lenses.

To design a camera system using interchangeable lenses, a combination of a lens unit and a camera unit is selected according to the specific AF system for the camera system. For example, it is possible to adopt an ordinary combination of a camera unit which has main AF control functions, i.e., functions of determining a focused or non-focused state, detecting non-focusing values, i.e., the extent of defocusing and the direction of defocusing (near focus or far focus), issuing an instruction to drive a focusing lens and performing other operations, and a lens unit which has a driving circuit and a driving device for driving the lens and the aperture in accordance with instructions from the camera unit. In such a system based on a combination of a camera unit having control functions and a lens unit having driving functions, the lens can be driven by instructions issued from the camera unit alone, and there is a one-to-one relationship between the instruction and the driving. No problem is therefore encountered even if the system is designed to use interchangeable lenses. That is, this type of combination is adopted for a camera system using interchangeable lenses and designed in consideration of AF functions.

However, possible combinations of camera units and lens units are not always limited to the above-mentioned type. It is necessary to consider other types of combination. In some cases, it is possible that AF control operations will be arbitrarily started and the operation of the control system will thereby fall into confusion, and there is therefore a risk of an increase in the extent of defocusing. For example, in the case of a combination wherein the lens unit has a function of performing AF by driving the focusing lens on the basis of its independent determination procedure, it is possible that the lens unit will move the lens without waiting for the lens drive instruction supplied from the camera unit, resulting in a defocused state of the image.

It is possible to prevent this problem by adopting a method of inhibiting the main camera unit from performing lens control by outputting a signal to stop the AF control operation of the main camera unit. For an interchangeable lens system, however, it is necessary to designate in respective cases items of control information which are to be selected from control information supplied from the camera unit or items of control information which are to be ignored. This method therefore entails a number of problems including an increase in the number of items of control information represented by the control stop signal and a reduction in the lens combination capacity.

For development of a camera system using interchangeable lenses, it is necessary to solve various problems including those described above.

SUMMARY OF THE INVENTION

In view of these problems, an object of the present invention is to provide a camera capable of performing control operations with accuracy irrespective of the type of lens.

Another object of the present invention is to provide a camera including interchangeable lenses free from any mismatch of the characteristics of each lens and the camera.

A still another object of the present invention is to provide a camera capable of correcting the output from a focus detection circuit according to the lenses attached to the camera to perform focusing operations with accuracy irrespective of any difference between characteristics of lenses employed.

In view of these circumstances, the present invention provides in one of its aspects a camera having: focus detecting means for detecting the state of focusing of an image of an object formed by an optical system; memory means for storing certain characteristics of the optical system; first control means for controlling the imaging position of the optical system on the basis of information stored in the memory means; second control means for controlling the imaging position of the optical system on the basis of an output from the focal point detecting means; and conversion means for detecting the extent of movement of the imaging position of the optical system, converting the extent of movement into a value according to the output from the focal point detecting means, and outputting the converted value.

A further object of the present invention is to provide a camera system with a lens unit designed for the use of a common camera unit for a plurality of lens units by providing, in each lens unit, means for converting control information from the camera unit into information suitable for driving the lens and means for converting driving information in conformity with the control information from the camera unit.

The present invention therefore provides in another of its aspects a camera system having: focus detecting means provided in the camera body and capable of detecting the state of focusing of an optical system of the lens unit; first correction means provided in the lens unit and capable of correcting a change in the imaging position of the optical system caused by a predetermined operation of the optical system of the lens unit; and second correction means for correcting the imaging position of the optical system on the basis of an output from the focal point detecting means; and conversion means provided in the lens unit and capable of detecting the extent of movement of the imaging position changed by the correction means, converting the extent of movement into a value according to the output from the focal point detecting means and outputting the converted value.

The present invention provides in still another of its aspects a lens unit having: control means for changing the imaging position of an optical system according to a state of driving of the optical system; correction means for correcting the imaging position on the basis of a signal in accordance with the state of focusing; and output means for detecting the extent of movement of the imaging position, converting the extent of the movement into a correction value according to the state of focusing, and outputting the correction value.

It is thereby possible to use one common operating system of the camera unit for a plurality of lens units having different characteristics. Specifically, in a camera system using interchangeable lenses in accordance with the present invention, each lens can be controlled without making the camera unit select a particular operation for each lens unit, thereby enabling an increase in the range of possible combinations of camera units and lenses.

A still further object of the present invention is to reduce burdens imposed on the camera unit by providing, in the lens unit, correction means for correcting a control signal from the camera unit so as to make the form of this signal suitable for the optical system of the lens employed.

A still further object of the present invention is to provide a camera improved in compatibility designed for the use of a common camera unit for a plurality of lenses by providing, in each lens unit, conversion means for converting a control signal from the camera unit into a signal suitable for the optical system of the lens employed.

Other objects and features of the present invention will become clear upon reading the following description taken in conjunction with the accompanying drawings.

BRIEF DESCRIPTION OF THE DRAWINGS

FIGS. 3(a) and 3(b) are flow charts of a control operation in accordance with the present invention;

FIG. 6 is a block diagram of another embodiment of the present invention;

FIG. 7 is a block diagram of a further embodiment of the present invention; and

DESCRIPTION OF THE PREFERRED EMBODIMENT

The present invention will be described below in detail with respect to preferred embodiments thereof.

Figure 1:
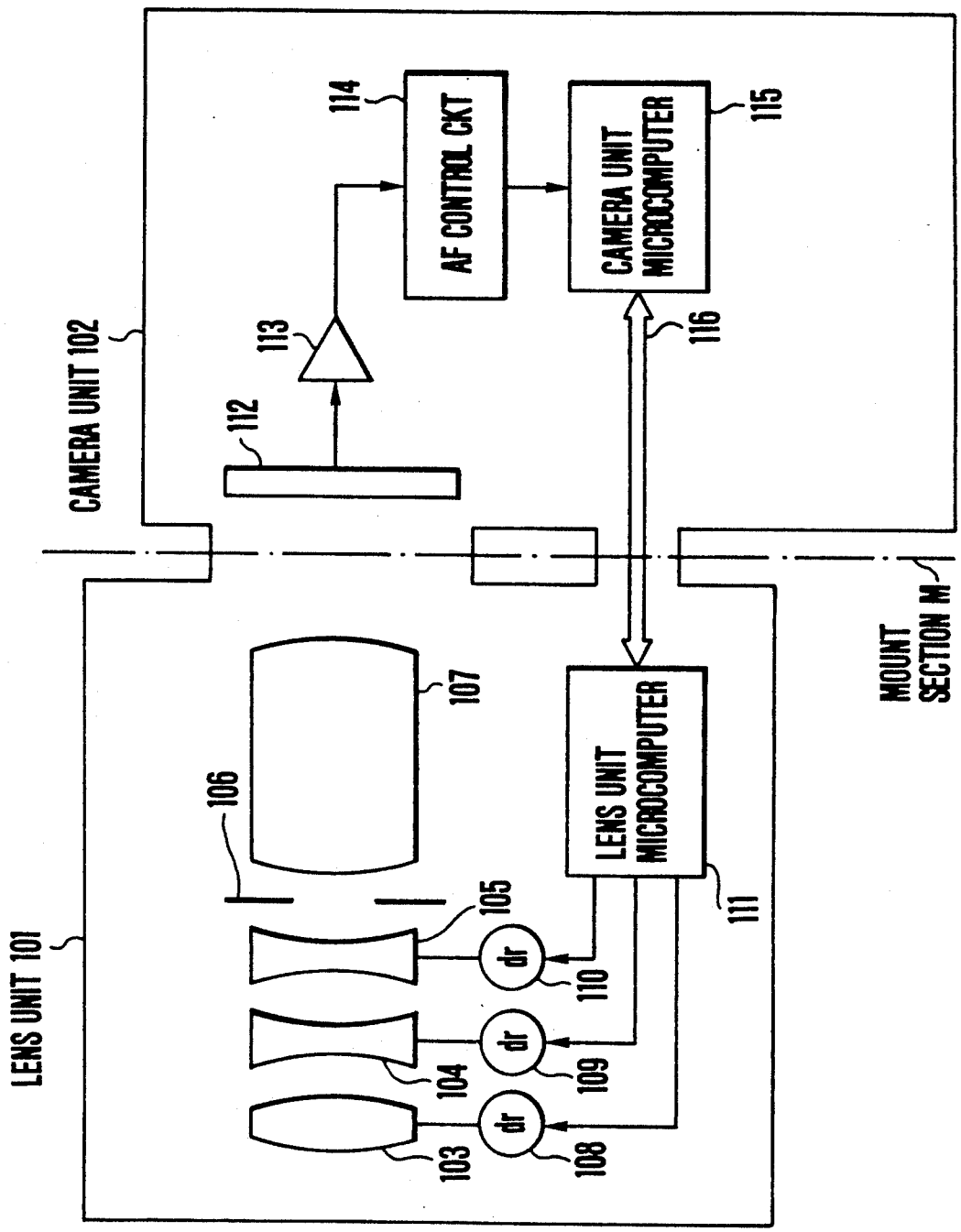
FIG. 1 is a block diagram of a camera which represents an embodiment of the present invention.

FIG. 1 shows a block diagram of an embodiment of the present invention in which a camera system in accordance with the present invention is applied to a video camera system. A type of lens arrangement for forming an image of the object on an imaging surface is known in which a group of rear lenses is moved to effect focusing while a front lens is fixed (and which arrangement will be hereinafter referred to as "rear focus zoom (RFZ)"). The lens arrangement shown in FIG. 1 represents an example of RFZ. Lenses and a circuit for driving and controlling the lenses are provided in a lens unit 101, and an imaging device and circuits for performing AF control on the basis of signals output from the imaging device are provided in a camera unit 102. The lens unit 101 and the camera unit 102 can be detachably attached to each other at a mount section M. The lens unit 101 includes: a front lens 103 (lens F) fixed to a lens barrel; a zooming lens 104 (lens V); a focusing lens 105 (lens C); a diaphragm 106; a group of lenses 107 (RR) for forming an image of the object on an imaging surface correctly; driving sections 108 to 110 including motors for driving the lenses V, C, and RR, respectively; and a microcomputer (hereinafter referred to as "lens unit microcomputer") 111 which performs communication with the camera unit by transmitting data including various items of control information and detection information and which outputs instructions to drive the lenses in order to effect focusing. The camera unit 102 includes: an imaging device 112 (e.g., CCD); a video signal amplifier 113; an AF control circuit 114 for converting video signals output from the amplifier 113 into signals suitable for the determination of an in-focus state, an out-of focus state, the extent and direction of defocusing and other factors; a microcomputer (hereinafter referred to as "camera unit microcomputer") 115 which determines the state of focusing or non-focusing on the imaging surface of the imaging device 112 on the basis of signals supplied from the AF control circuit 114 and which sends lens drive instructions to the lens unit 101 to form the image of the object on the imaging plane of the imaging device 112 with correct focusing; and a transmission path 116 through which communication information is transmitted between the microcomputers of the camera unit and the lens unit.

Figure 2:
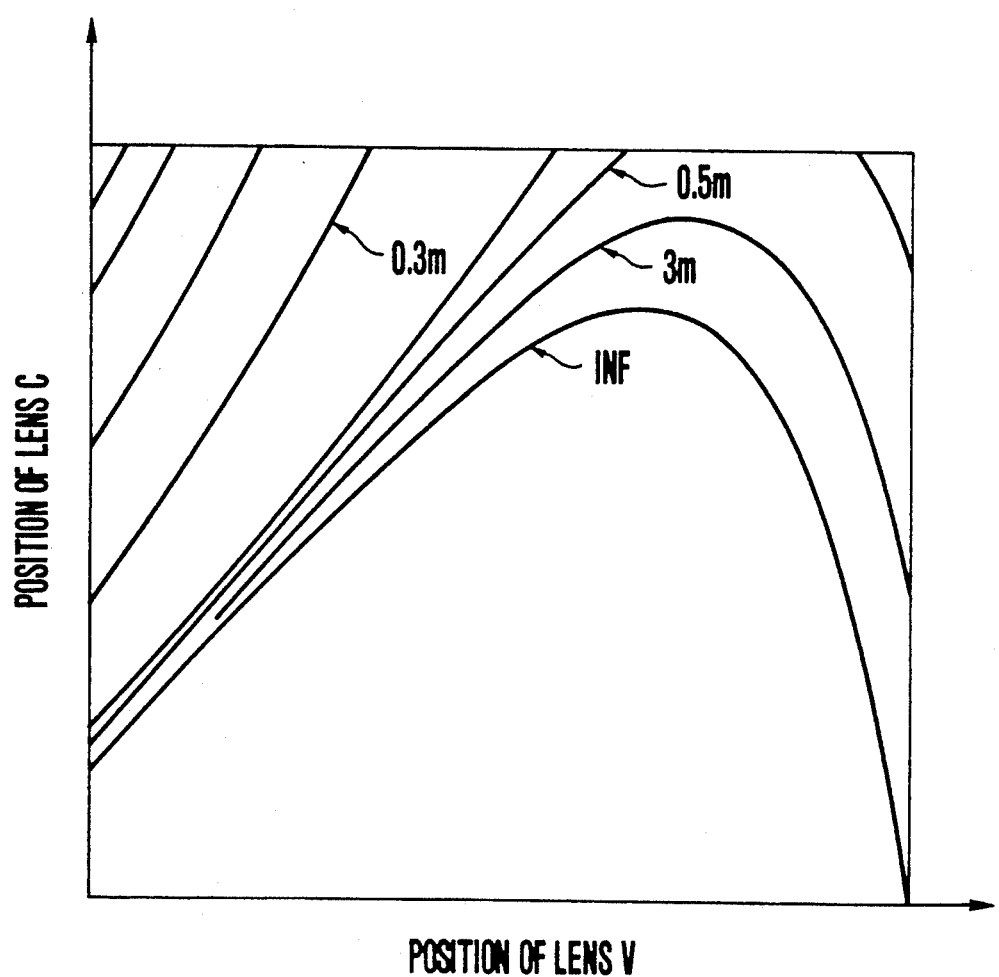
FIG. 2 is a diagram of the relationship between the positions of lenses V and C at the time of focusing with the distance to the object used as a parameter.

Focusing of the lens arrangement shown in FIG. 1 can be effected only by moving the lens C 105 parallel to the optical axis provided that the lens V 104 is not driven for zooming, that is, the focal length is constant. In a case where the lens 104 is being moved to perform zooming, it is necessary to correct the focusing of the object image by moving the lens C 105 also according to the position of the lens V 104 and the distance to the object. FIG. 2 shows characteristic curves (V-C curves) indicating the position of the lens C with respect to the lens V with the distance to the object used as a parameter when zooming is performed while maintaining the in-focus state. The V-C curves therefore represent drive speed characteristics of the lens C with respect to the position of the lens V. As clearly seen in FIG. 2, the V-C curves are complicated and have various differential values according to the distance to the object and the position of the lens 104. Accordingly, the V-C curves cannot be accurately approximated unless high-order functions are used. Also, the V-C curves greatly vary according to the design of the group of lenses.

In consideration of these facts, a method of moving the lens C during zooming in accordance with each of the V-C curves as accurately as possible may be adopted in which characteristics represented by the V-C curves are previously stored in the computer of the camera unit, and driving of the lens is controlled on the basis of the data on the V-C curves. That is, the desired characteristic curve determined by the positions of the lens V and the lens C and the distance to the object used as the parameter is selected from the V-C curves, and the subsequent motion of the camera is predicted and determined on the basis of the data on the selected curve stored in the computer.

In the case of an interchangeable lens system, there are many varieties of combinations of lenses and the camera unit, and the method of storing, in the camera unit, data on V-C curves representing different characteristics of the respective lenses entails a problem of an increase in the capacity of the memory of the camera unit and is disadvantageous in terms of efficiency, or the general compatibility of the interchangeable lenses is considerably reduced. In contrast, if data on the V-C curves relating to a particular lens is stored in the lens microcomputer 111 and if driving of the lens C is controlled in the lens unit 101 when a zooming operation is performed by driving the lens V, the general compatibility of the interchangeable lenses is not impaired and the zooming can be performed while maintaining the focused state on the basis of the information supplied from the camera unit. Examples of the means for controlling driving of the lens V and the lens C in accordance with V-C curves are disclosed in U.S. patent application Ser. Nos. 359,730 and 359,388 filed on May 31, 1989, respectively. Japanese Patent Publications Nos. 52-15226 and 56-47533, Japanese Laid-Open Patent Applications Nos. 62-296110, 62-284316, 55-76309 and 59-133783 also disclose methods of driving V-C lens.

As described above, if driving of the lens C is controlled during zooming on the basis of the data on the V-C curves stored in the microcomputer 111 of the lens unit, problems relating to the basic zooming operation such as zooming for a stationary object can be reduced. However, it is necessary to use information on defocusing due to an error in the adjustment of the lens C, i.e., information supplied from the AF control circuit 114 of the camera unit in order to correct a defocused state resulting from failure to select a suitable one of the V-C curves for the optimum control or resulting from tracing of a wrong curve owing to a change in the distance to the object during zooming or the roughness of the stored V-C curve information. Considering the compatibility and general use of the camera unit 102 and the interchangeable lens unit 101, it is more preferable to make the camera unit perform an AF operation according to the defocusing information like the ordinary AF operation even during zooming than to make the camera unit perform a special AF operation only during zooming. Since, as is apparent from the V-C curves of FIG. 2, the operation of the lens C during zooming is different from the simple AF operation conducted when zooming is not performed, it is necessary to select and process by means of the lens unit microcomputer 111 defocusing information supplied from the camera unit according to whether or not zooming is being performed.

FIG. 3(a) shows a block diagram of an arrangement in which AF control signals supplied from the unit microcomputer 115 are selectively processed by the lens unit microcomputer 111 with respect to the zooming operation and the non-zooming operation to enable the camera unit microcomputer 115 to perform the ordinary operation independently of the zooming operation even during zooming. The functions of switches and other components can be achieved by means of software or hardware provided in the control microcomputer. In FIG. 3(a), blocks having the same functions as those of FIG. 1 are indicated by the same reference characters. The lens unit microcomputer 111 has an arithmetic section 111A which will be hereinafter referred to as "lens unit microcomputer", and a data correction circuit 111B which is formed inside the lens unit microcomputer and which corrects or converts, during zooming, defocusing information supplied from the camera unit microcomputer 115, that is, the extent of defocusing in accordance with the degree of out-of-focus detected by the AF control circuit, and outputs a lens driving control signal to move the lens C in accordance with each of the V-C characteristic curves with respect to the movement of the lens V. Data on the V-C characteristic curves shown in FIG. 2 is therefore stored in the data correction circuit 111B, and the deviation of the lens C from the suitable position determined on the basis of each of the V-C curve with respect to the movement of the lens V is determined by the data correction circuit 111B from defocusing information supplied from e camera unit microcomputer 115 and is supplied to the lens unit microcomputer 111A. In FIG. 3(a), the data correction circuit 111B is illustrated separately from the lens unit microcomputer 111A to clarify its role but in fact it is incorporated in the lens unit microcomputer 111 as an information table having data on the V-C curves, as illustrated in FIG. 3(b), and is used for lens control by referring to the data on the basis of the control algorithm of the microcomputer. A discrimination signal indicating whether or not any zooming operation is being performed in the camera unit is transmitted through a transmission line 301. A switch 111C is controlled on the basis of the discrimination signal transmitted through the transmission line 103 in such a manner that it is changed over to establish connection through a contact 111a at the time of zooming or through a contact 111b when zooming is not performed. Defocusing information is transmitted from the camera unit microcomputer 115 to the lens unit microcomputer 111A through a transmission line 302. The lens unit microcomputer 111A has an input terminal 303 for receiving information on the direction of defocusing (near focus or far focus) or the direction of correction of defocusing from the camera unit microcomputer 115, an input terminal 304 for receiving information on the extent of defocusing transmitted from the camera unit, input terminals 307, 306, and 305 for respectively receiving information on the positions of the lens V 104, the lens C 105 and the diaphragm 106 from the encoder. The camera unit microcomputer 115 has input terminals 308 to 310 for respectively receiving information on the states of driving of the lens V 104, the lens C 105 and the diaphragm 106 from the lens unit microcomputer 111A. Encoders 311 to 313 are provided which are used to detect the positions of the lens V 104, the lens C 105 and the diaphragm 106.

During the ordinary AF operation conducted without performing zooming, the switch 111C is maintained for connection through the contact 111b according to the discrimination signal transmitted through the transmission line 301. If the camera unit microcomputer 115 determines that the lens is in an out-of-focus state, information on the extent of defocusing and information on the direction of defocusing or the direction of correction of the lens position are supplied to the input terminals 304 and 303. If zooming is not being performed and if the lens V is not being driven, the lens C is driven in the direction of reduction in the extent of defocusing in the same manner as the ordinary AF operation without considering the V-C curves. The lens unit microcomputer 111A sends a motor drive instruction based on these items of information to the focusing lens driving section 109 to move the lens C 105, thereby effecting focusing. If at this time a signal representing the extent of actual movement of the lens C is output from the encoder 301 to the encoder input terminal 306 of the lens unit microcomputer 111A, a lens driving control loop is formed so that the lens can be driven stably. If it is necessary to transmit the signal representing the extent of actual movement of the lens to the camera unit microcomputer 115 also, the signal may be directly transmitted from the lens unit microcomputer 111A to the camera unit microcomputer 115. Diaphragm drive information and other kinds of information output from the camera unit microcomputer 115 can also be used for control in a similar manner.

In a case where the lens C is driven while being adjusted in accordance with one of the V-C curves on the basis of defocusing information supplied from the camera unit microcomputer during a zooming operation, which causes defocusing unless the lens C is moved in accordance with the V-C curve, the camera system operates in a way different from that of the ordinary AF operation. That is, while the camera unit microcomputer processes and transmits various signals on the assumption that the lens C 105 will move to an extent necessary for compensating the extent of defocusing detected by the camera unit, the lens unit microcomputer 111A drives the lens C so as to move the same to an extent different from that designated by the processing of the camera unit and, hence, the instruction issued from the same in order to follow the movement of the lens V on the basis of the V-C curve. It is therefore possible that, when the camera unit microcomputer 115 controls the lens movement in the same manner as the ordinary AF operation on the basis of the signals supplied through its input terminals 308 to 310, the extent of actual movement of the lens C 105 input through the input terminal 309 as the information on the lens C from the encoder will deviate from the control instruction value output from the camera unit microcomputer 115, resulting in a confused state of the operation of the camera unit microcomputer 115 during zooming. That is, there is a possibility of failure to maintain the correspondence between the instruction issued to move the lens C and the extent of the actual movement and, hence, failure to control the lens with accuracy, resulting in a malfunction such that an operation which must cause defocusing does not cause defocusing or the lens C is driven when no moving instruction is issued.

This problem will be explained below in more detail with reference to FIG. 4.

Figure 4:
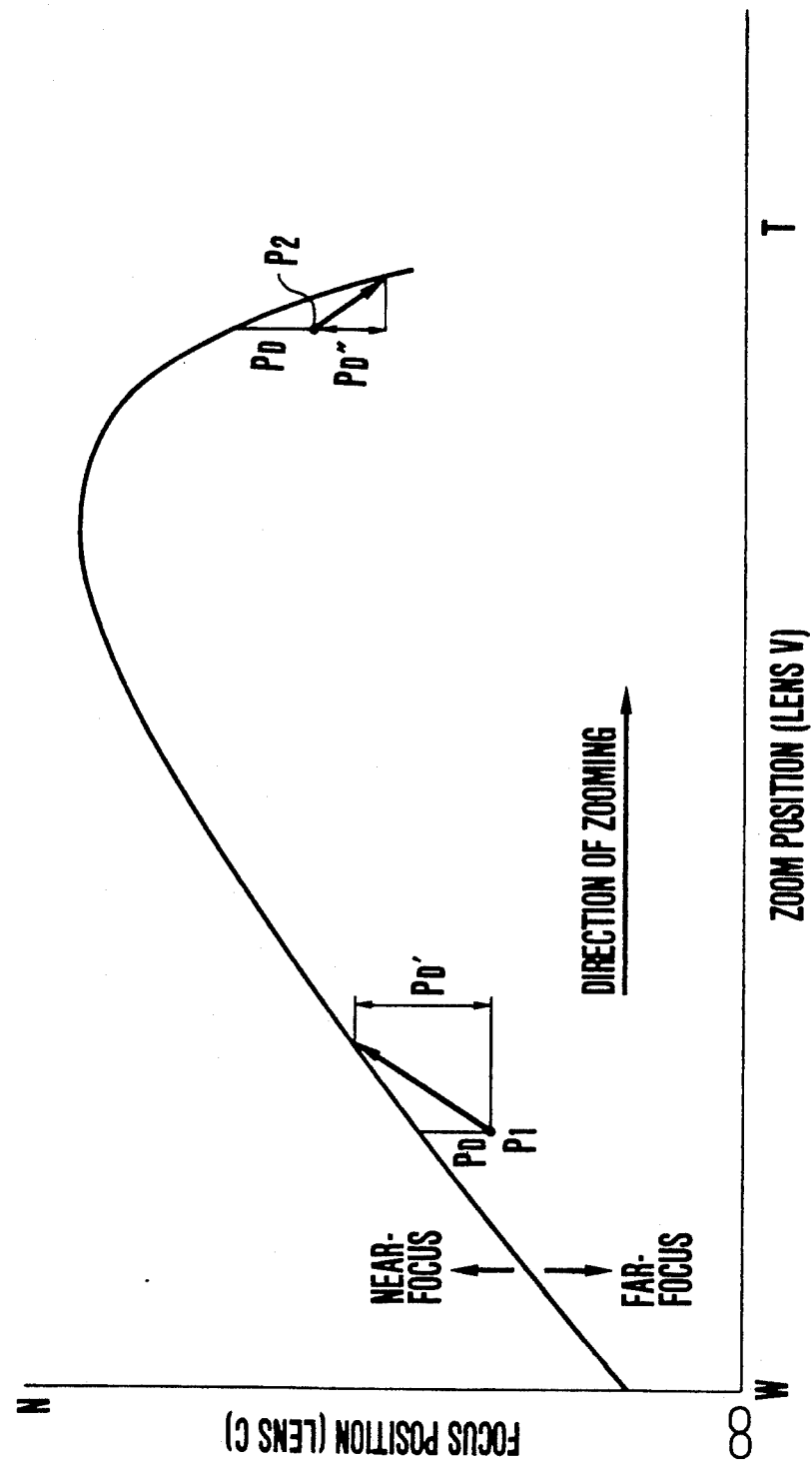
FIG. 4 is a characteristic diagram illustrating lens control operation of the present invention.

FIG. 4 shows one of the V-C curves shown in FIG. 2. An explanation will be given of a case where the lens V and the lens C are moved in accordance with this curve and where the zooming is effected from a wide-angle side to a telephoto side.

There is no possibility of defocusing if the lens V and the lens C are moved in accordance with this curve, as described above. The positions of these lenses are represented by a point above the curve in the case of near-focus or represented by a point below the curve in the case of far-focus.

It is assumed that the lens C is positioned on the far-focus side of the V-C curve as indicated at $P_1$ in FIG. 4, thereby effecting defocusing. As can be understood from the graph, the lens C can be focused by being moved by a correction value $L=P_D'$ to the near-focus side as the lens V is moved.

If the lens C is positioned on the far-focus side as indicated at $P_2$ in FIG. 4, it is necessary for correcting the position of the lens C in the direction of near-focus. However, in this case, the V-C curve is also descending, and the lens C is driven in the direction of far-focus to an extent represented by the correction value $L=P_D''$.

That is, when the lens C is positioned as indicated at $P_2$, the camera unit microcomputer 115 designates correction in the direction of near-focus because the lens is on the far-focus side, but the extent of movement actually detected by the focus encoder is obtained as movement in the direction of far-focus, and the operation of the camera unit falls into confusion, resulting in a control disabled state. In accordance with the present invention, however, information on the movement of the lens C always consistent with the information on the extent and direction of defocusing transmitted from the camera unit is returned as focusing lens information to the camera unit microcomputer 115 in such a manner that, in the above case, information representing the movement of the lens through $L=P_D''$ in the direction of near-focus is returned to the camera unit microcomputer 115.

That is, even when the camera unit corrects the operation of the lens C, it receives the same information on the movement of the lens C as in the case of the ordinary AF operation in conformity with the information on the extent and direction of defocusing output from the camera unit. Consequently, the camera unit can always control the lens in the same manner irrespective of the characteristics and the kind of the lens employed, and it is possible to use a common control system for different lens units and, hence, to provide a completely compatible camera system.

The operation of the present invention is described in the above with respect to the case where zooming is effected from the wide-angle side to the telephoto side. However, the system can also be controlled in the same manner in the case of zooming from the telephoto side to the wide angle side.

In accordance with the present invention, therefore, the data correction circuit 111B is used to correct and change the defocusing extent signal supplied from the camera unit microcomputer 115 and detected by the AF control circuit into a correction value based on the V-C curve without directly transmitting the signal to the lens unit microcomputer, and drive information which is formed as a kind of dummy signal for the camera unit is supplied to the input terminal 309 as lens C encoder information, thereby avoiding any confusion of the operation of the camera unit microcomputer 115. That is, the information on the extent of defocusing transmitted from the camera unit microcomputer 115 via the transmission line 302 is input into the data correction circuit 111B via the contact 111a of the switch 111C. The data correction circuit 111B determines a correction value on the basis of the given defocusing extent information in consideration of driving of the lens in accordance with the V-C curve, i.e., the extent to which the lens C is moved in accordance with the corresponding one of the V-C curves of FIG. 2, and the lens unit microcomputer 111A calculates from the correction value and the defocusing direction information supplied via the transmission line 303 a signal for driving the lens C by the lens C driving section 109, thereby driving the lens C 105.

The lens unit microcomputer 111A also calculates the extent to which the focusing lens is moved when then zoom lens 104 is stopped on the basis of the corrected value of the extent of defocusing determined by the data correction circuit 111B to enable tracing the V-C curve with accuracy, obtains the extent of dummy movement by correcting the extent of actual movement, and outputs the dummy value to the input terminal 309 of the camera unit. The camera unit microcomputer 115 outputs the extent of defocusing detected by the AF control circuit alone and receives the same focusing lens movement information as the ordinary AF operation irrespective of whether or not correction on the basis of the V-C curve is effected on the lens unit side, i.e., irrespective of whether or not zooming is being performed. It is therefore possible to effect fine adjustment of the lens C 105 during zooming while avoiding any confusion in the AF control system of the camera unit microcomputer 115, i.e., any malfunction due to inconsistency between the extent of defocusing transmitted from the microcomputer and the movement of the focusing lens. In a case where the information on the extent of defocusing transmitted from the camera unit microcomputer 115 via the transmission line 302 is supplied as the corrected lens C driving value to the lens unit microcomputer 111A, the corrected value may be directly used as the dummy signal obtained by correction for movement in accordance with the V-C curve.

The data correction circuit 111B is illustrated in the above as a section provided separately from the lens unit microcomputer 111A, but the function of the data correction circuit 111B may be provided in the microcomputer 111A by means of software.

The above-described control operation of the lens unit microcomputer will be described with reference to the flow charts of FIGS. 5(a) and 5(b). As mentioned above, the lens unit microcomputer 111 is constituted by the arithmetic section 111A and the data correction circuit 111B provided separately from each other, but these sections may be constructed within one lens unit microcomputer in an applied state. Also, the information on the V-C characteristic curves shown in FIG. 2 may be previously stored in a ROM provided in the lens unit microcomputer.

Figure 5A:
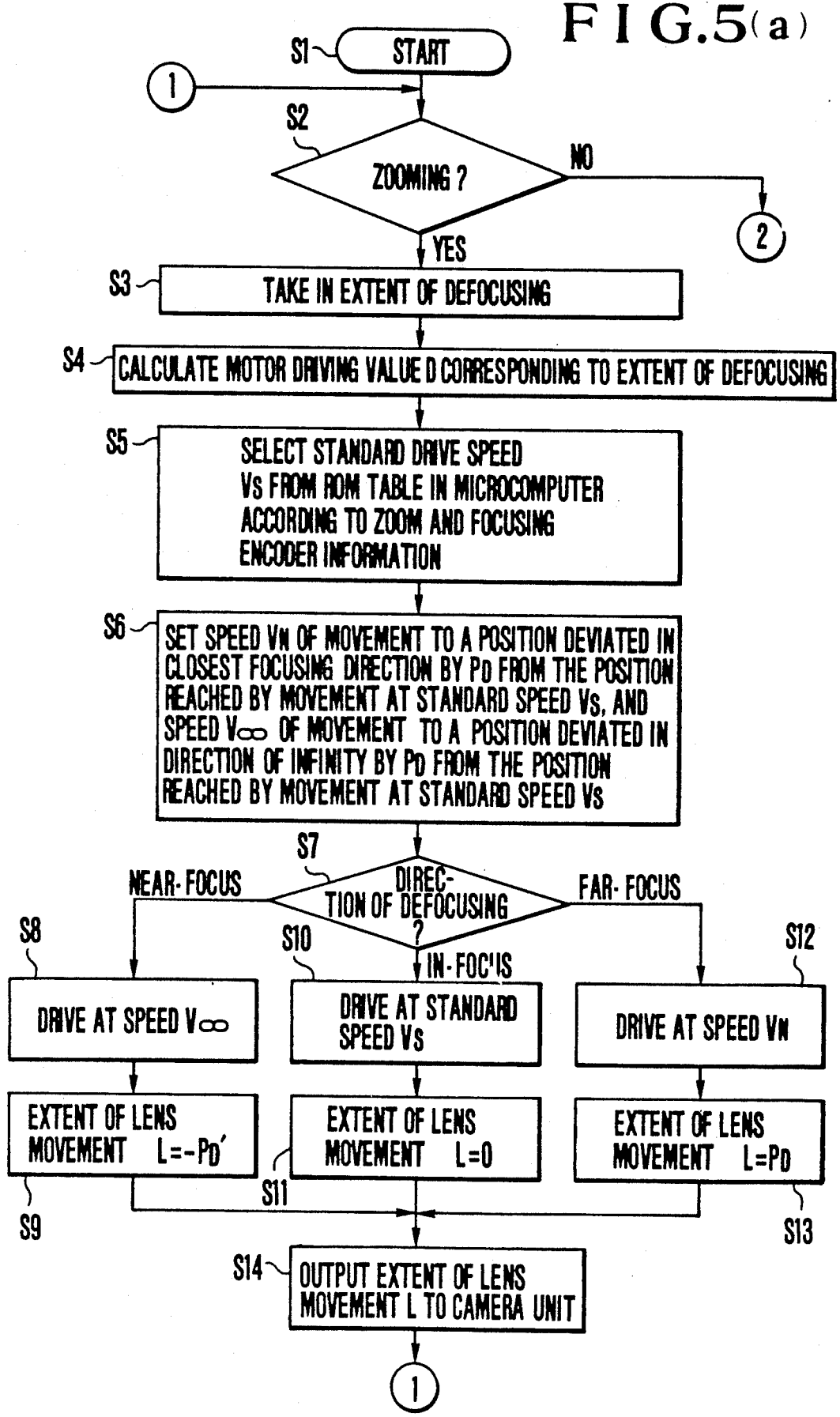
FIGS. 5(a) and 5(b) are flow charts of a control operation of the lens control operation of the present invention.

Referring to FIG. 5(a), the process starts in step S1, and determination is made as to whether or not zooming is being performed. This can be made on the basis of the signal 301 that indicates whether or not zooming is being performing and that is supplied from the camera unit microcomputer 115. If it is determined in step S2 that zooming is not being performed, the process proceeds to step S15 and the ordinary AF operation is conducted. More specifically, the switch 111C is changed over to the 111b side and the data on the extent of defocusing is supplied to the lens unit microcomputer 111 without being processed by the data correction circuit 111B. Since in this case the lens V is not moved, no deviation of the focus due to the movement of the lens V takes place. The V-C curves shown in FIG. 2 are therefore irrelevant of the operation of the lens C, and it is possible tc positively correct defocusing by driving the lens C 105 on the basis of the AF information output from the camera unit microcomputer 115, i.e., information on the extent and direction of defocusing. The ordinary AF operation will be explained later.

If it is determined in step S2 that zooming is being performed, the process proceeds to step S3, and A/D converted value of the defocusing extent information transmitted from the camera unit microcomputer 115 is supplied to the lens unit microcomputer 111A. A driving value D for the operation of the lens C driving motor according to the extent of defocusing is thereby calculated, and a standard speed $V_S$ of the lens C relating to the present operating conditions of the lens C is selected on the basis of the V-C curve of FIG. 2 and the positions of the lens V and the lens C detected by the zoom encoder and the focus encoder (steps S4, S5). Then, a speed $V_N$ is calculated and set at which the lens C moves to reach a point which is deviated in the direction of the closest focusing side by a distance corresponding to the above driving value D from the point that the lens C reaches by moving at the standard speed $V_S$ for a predetermined period of time, and a speed $V_\infty$ is calculated and set at which the lens C moves to reach a point which is deviated in the direction of the infinity side by the distance corresponding to the driving value D from the point that the lens C reaches by moving at the standard speed $V_S$ (step S6). The information on the defocusing direction supplied from the camera unit microcomputer 115 is then discriminated (step S7). If the lens C 105 is not near-defocused or far-defocused but correctly focused, it is driven at the standard speed $V_S$ in step S10 and the extent of movement of the lens C, i.e., the correction value L is set to 0 (steps S10, S11) because it is determined that the lens C is being moved in accordance with the V-C curve of FIG. 2. The lens C correction value L is returned as focus encoder information to the terminal 311 of the camera unit microcomputer 115 (step S14).

If it is determined in step S7 that the lens C is defocused in the direction of near-focus, the lens C is driven so as to move at the speed $V_\infty$ (step S8) in the direction of far-focus in order that it may reach the point deviated in the direction of the infinity side from the point reached by the movement at the standard speed $V_S$ calculated in step S6 by a driving distance $P_D$ corresponding to the extent of defocusing. The extent L of movement of the lens C thereby effected on the basis of the extent of defocusing is set as $-P_D'$ which indicates that the lens C is moved in the direction of far-focus, and this lens C movement information is returned as focus encoder information to the camera unit microcomputer 115.

If it is determined in step S7 that the lens C is defocused in the far focusing direction, the lens C is driven so as to move at the speed $V_N$ (step S12) in the direction of near-focus in order that it may reach the point deviated in the direction of the closest focusing side from the point reached by the movement at the standard speed $V_S$ calculated in step S6 by a driving distance $P_D'$ corresponding to the extent of defocusing. The extent L of movement of the lens C is set as $P_D'$ which indicates that the lens C is moved in the direction of near-focus to the extent corresponding to the extent of defocusing to correct the near focus, and this lens C movement information is returned as focus encoder information to the camera unit microcomputer 115.

That is, in the lens unit, the position of the lens C is corrected by adding the defocusing extent information supplied from the camera unit to the lens C correction value determined with the movement of the lens V for zooming.

On the other hand, the camera unit microcomputer sends the information on the extent of defocusing caused by a change in the distance to the object to the lens unit, and receives, from the lens unit, the information on the extent of movement of the lens C corresponding to the extent of defocusing. Thus, the extent of movement of the lens C received by the camera unit microcomputer always corresponds to the extent of defocusing based on the change in the distance to the object even if the lens unit corrects the position of the lens C for tracing the V-C curve while focusing the lens C according to the change in the distance to the object. It is therefore possible for the camera unit to perform focusing according to the change in the distance to the object irrespective of the control effected by the lens unit attached to the camera unit.

Figure 5B:
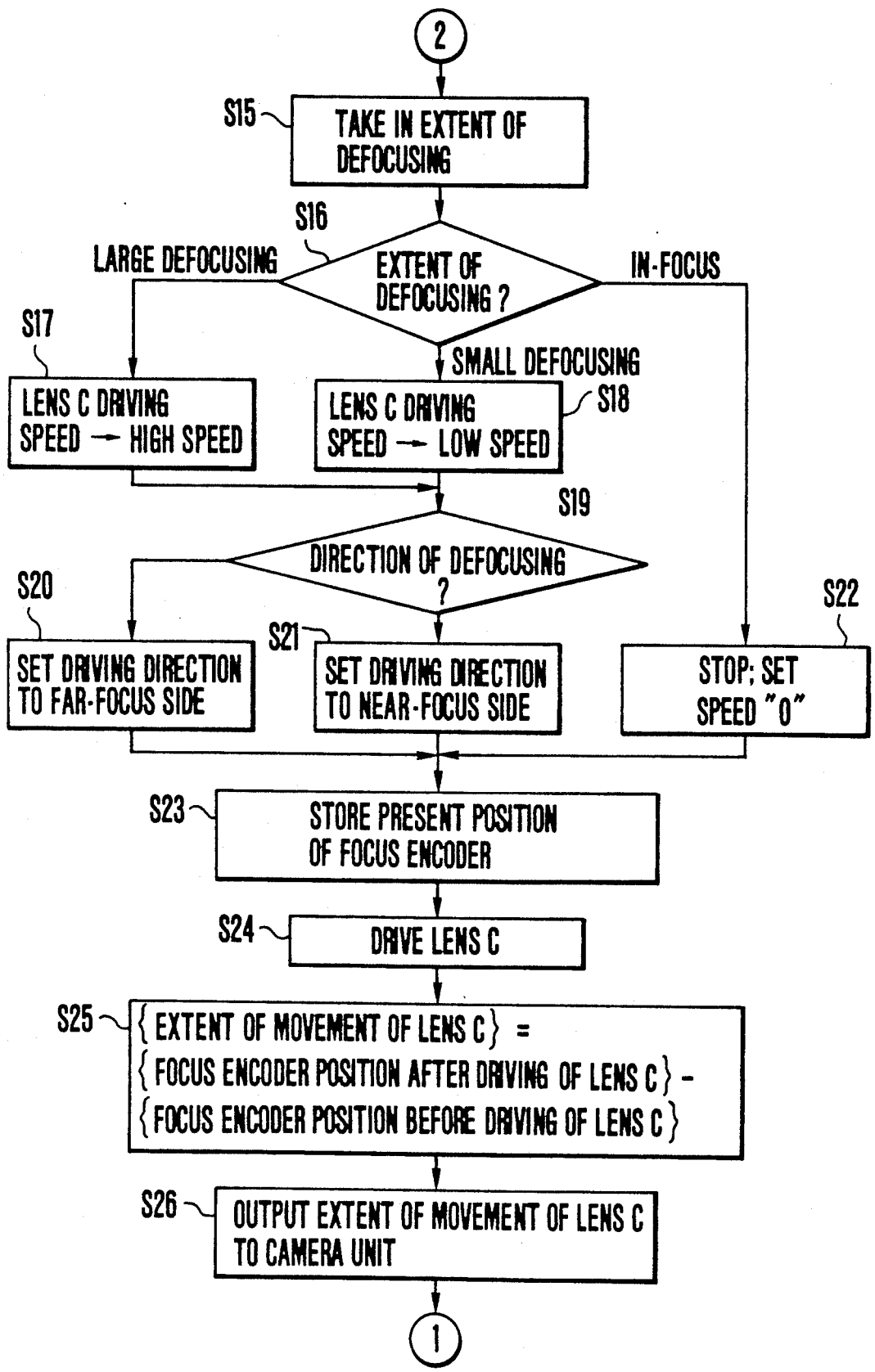

If it is determined in step S2 that zooming is not being performed, the process proceeds to the control of the ordinary AF operation shown in FIG. 5(b).

In this event, the switch 111C is changed over to the terminal 111b, and the defocusing extent information sent from the camera unit is supplied to the lens unit microcomputer or the arithmetic section 111A without being processed by the data correction circuit 111B. As mentioned above, the data correction circuit 111B is incorporated in the lens unit microcomputer, but it is illustrated out of the lens unit microcomputer 111A to clearly show that correction based on the V-C curve is effected if zooming is being performed or the AF operation is effected irrespective of the lens V if zooming is not being performed.

If the ordinary focusing operation is started, the extent of defocusing transmitted from the camera unit is read in step S15, and the degree of defocusing is determined in step S16. If the extent of defocusing is large, the speed of the lens C driving motor is set to a high speed, if the extent of defocusing is small, the motor speed is set to a low speed, or if the lens is in the focused state, the stop mode of a speed 0 is set (steps S17, S18, S22). After the degree of defocusing has been determined, the direction of defocusing is discriminated in step S19. In the case of a near focus, the motor driving direction is set in step S20 to move the lens C in the direction of far-focus. In the case of far-focus, the motor driving direction is set reversely in step S21 to move the lens C in the direction of near-focus.

After the speed and the direction of driving effected by the lens C driving motor have been set as a result of the above flow, the information on the lens C position obtained by the focus encoder 312 before the lens C is driven is stored in step S23 as a variable POS. This positional information from the focus encoder 312 is formed by a counter which counts pulses for driving the lens C driving motor if this motor is a pulse motor.

In step S24, the lens C driving motor is driven on the basis of the driving value and the driving direction obtained in the above-described manner. If the lens C is focused, it is not driven since the speed thereof is set to "0".

In step S25, the value of the encoder information obtained before the driving of the lens C and stored in step S23 is subtracted from the output from the focus encoder. The count value of the focus encoder 312 or the pulse counter, and the extent and direction of actual movement of the lens C are thereby calculated and are output to the camera unit as focusing lens movement information in step S26.

That is, in a case where zooming is not performed, the actual movement of the lens C directly corresponds to the movement calculated from the information on the extent and direction of defocusing supplied from the camera unit, and the ordinary AF operation is therefore possible.

As described above, in the first embodiment of the present invention, information returned from the lens unit to the camera unit is always consistent with the AF information transmitted from the camera unit even if a certain kind of processing is effected in the lens unit on the basis of the AF information from the camera unit.

FIG. 6 shows a second embodiment of the present invention. In FIG. 6, constituent blocks having the same functions as those of FIGS. 1 to 3(b) are indicated by the same reference characters. The overall construction of the system in accordance with the second embodiment is the same as the first embodiment, and the difference therebetween resides in the construction of transmission lines 301 to 304 including the switch 111C. In this embodiment, the information on the V-C characteristic curves shown in FIG. 2 is previously stored in the lens unit microcomputer. As shown in FIG. 6, the lens unit has a microcomputer 401 in which an arithmetic section 401A (hereinafter referred to as "lens unit microcomputer"), as in the case of the arrangement shown in FIG. 3(a), and a switch 401B which is changed over to establish connection through a contact 401a at the time of zooming or through a contact 401b when zooming is not performed. A power source 402 applies a predetermined bias voltage to the switch 401B. This voltage is provided to establish a state of the lens unit microcomputer in which this computer is supplied with no information on the extent of defocusing through the input terminal 304. In this case, the provision of the voltage has no specific meaning, and digital information, for example, may be used instead of the analog voltage value.

When an ordinary AF mode wherein zooming is stopped is selected, the switch 401B is changed over to the terminal 401b side, and the lens C 105 is driven on the basis of AF information supplied from the camera unit microcomputer 115, thereby performing the ordinary AF operation. At the time of zooming, the switch 401B is changed over to the terminal 401a side and the constant voltage 402 is applied to the lens unit microcomputer 401A, thereby shutting off the supply of control information from the camera unit microcomputer 115 to ignore the AF information supplied from the same. The correction value supplied to the lens unit microcomputer 401A is thereby fixed, and the lens C is driven in accordance with the characteristics of the V-C curve stored in the lens unit microcomputer 401A. This system also makes it possible to prevent any malfunction of the main camera unit due to inconsistency between items of information on the extent of defocusing and the movement of the lens.

The second embodiment is an simplified modification of the first embodiment and is suitable for a system which does not need any fine AF adjustment.

As described above, in a case where the manner of controlling each of interchangeable lenses selectively used in a camera system designed for operation with interchangeable lenses needs to be changed according to the characteristics of each lens, the characteristics of each lens are memorized in the lens unit, and the lens unit is independently driven, if necessary. It is thereby possible to construct an interchangeable lens system having a wide selection range without impairing the compatibility with lenses.

An interchangeable lens system in which the camera unit has AF control functions can be constructed in such a manner that a dummy signal is transmitted from the lens unit to the camera unit or AF instructions from the camera unit are ignored when the lens unit independently drives the lens, thereby preventing any abnormality of the control loop even if the lens moves in a manner incongruous with the control instructions supplied from the camera unit to the lens unit. The AF control can therefore be conducted stably.

The above-described constructions eliminate the need for storing information on a plurality of lenses in the main memory, thereby enabling a reduction in the size of the circuit.

Referring to FIG. 7, internal sections of a lens unit microcomputer 200 having different functions are illustrated to clarify the functions of the lens unit microcomputer 200. The basic operation of this microcomputer is the same as the above-described embodiments.

In FIG. 7, constituents identical or corresponding to those of the above-described embodiments are indicated by the same reference characters and the description for them will not be repeated.

The lens unit microcomputer 200 has a memory block 200A in which data on V-C characteristic curves such as those described above, data on the speed at which the lens C is moved and so on are stored, and a computation block 200B which calculates, on the basis of the extent and direction of defocusing supplied from the camera unit microcomputer 115, a driving value and information on the driving direction for the operation of driving and focusing the lens C and drive control information for controlling the lens V and the lens C in accordance with each of V-C characteristic curves stored in the memory block 200A if zooming is being performed. The lens unit microcomputer 200 further has a speed control block 200C for controlling, on the basis of the results of calculation effected by the arithmetic block 200B the speeds at which the lenses V and C are respectively moved, and a data correction block 200D which corrects, during zooming, movement information from the lens V encoder 311 and the lens C encoder 312 so as to convert this information into dummy information in conformity with the AF information output from the camera unit microcomputer 115, and which sends the converted information to the input terminals 308 to 310 of the camera unit microcomputer 115. These blocks are illustrated as portions of the microcomputer for explanation but they are actually control means based on software provided as a predetermined program stored in the lens unit microcomputer 200.

As described above, the reason for the need to correct the positional information or form the dummy information is that, in a system in which the focal plane is changed by a zooming operation and this change is simultaneously corrected by the movement of a focusing element, there is a possibility of the lens C being driven during zooming in a manner incongruous with a movement instruction issued from the AF means.

In accordance with the present invention, therefore, information on the movement of the lens C is taken into the lens unit microcomputer and, if it becomes inconsistent with the AF information from the camera unit, it is rewritten into information in accordance with the AF information, i.e., the extent and direction of defocusing supplied from the AF control circuit, thereby forming dummy information which is supplied to the camera unit microcomputer 115.

The correction value for correcting the information on the movement of the lens C is changed by calculation according to the movement of the lens C in relation to the V-C characteristic curves (which of the V-C curves determines the movement of the lens C), the focusing state and so on. As a result, the lens C can be moved in accordance with one of the V-C curves and the camera unit can perform the same AF operation as the ordinary non-zooming AF operation.

In this embodiment, information on the direction of driving of the lens C is always stored in the lens unit microcomputer 200, and the direction of driving of the lens C for focusing is discriminated by comparing the stored lens C driving direction with the defocusing direction supplied from the camera unit microcomputer, thereby controlling acceleration and deceleration of the lens C driving speed so that the lens C is focused promptly.

Figure 8:
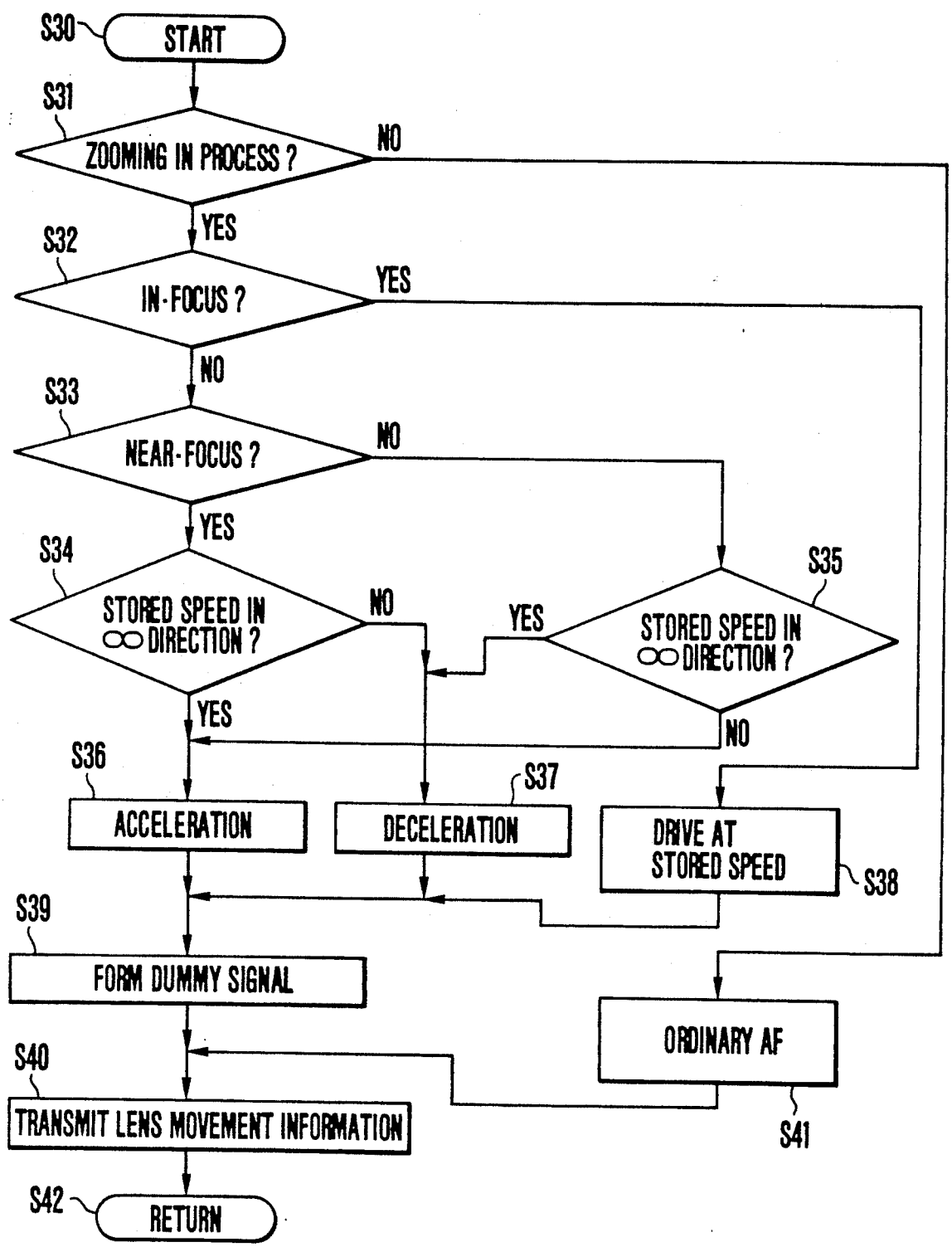
FIG. 8 is a flow chart of another example of control operation of the present invention.

FIG. 8 shows a flow chart of a control operation of the lens unit microcomputer 200 which is obtained by simplifying the control in accordance with the flow charts of FIGS. 5(a) and 5(b).

The control operation is started in step S30, and determination is made in step S31 as to whether or not zooming is being performed. If zooming is not being performed, the process proceeds to step S41 to perform ordinary AF operation and directly transmit lens movement information to camera unit microcomputer 115, thereby enabling the camera unit to perform the ordinary AF operation. The lens unit microcomputer 200 supplies a motor driving instruction to the lens C driving section 109 on the basis of the extent and direction of defocusing supplied from the camera unit, thereby moving the lens C to effect focusing. At this time, if the encoder 312 is used to inform the lens unit microcomputer 200 of the extent of actual movement of the lens C, a lens drive control loop is completed and the lens can be thereby driven stably.

If it is determined in step S31 that zooming is being performed, a control operation different from the ordinary AF operation is performed.

In this event, the process proceeds to step S32 and determination is made as to whether or not the lens C is in an in-focus state. If the lens is in an in-focus focused state, the process proceeds to step S38 and the lens C (focusing lens) is driven at a predetermined speed previously stored in a ROM or the like provided in the lens unit microcomputer.

If it is determined in step S32 that the lens C is in an out-of-focus state, the process proceeds to step S33 to examine whether defocusing is near-focus or far-focus. In the case of near-focus, the process proceeds to step S34 and determination is made as to whether or not the direction of the speed previously set is the direction of infinity or closest focusing. In the case of the direction of infinity, the operation of the lens driving system is accelerated in step S36 so as to promptly reduce the extent of near-focus because the direction of movement of the lens and the direction of reduction in the extent of defocusing coincide with each other. If in the case of near-focus the direction of the stored speed corresponds to the direction of closest focusing, the process proceeds to step S37 to decelerate the operation of the lens driving system because the direction of movement of the lens is opposite to the direction of reduction in the extent of defocusing. If in the case of near-focus the stored speed is 0, a negative speed is set in step S37, thereby also reducing the extent of defocusing.

If it is determined in step S33 that the lens C is not near-focused but far-focused, the selection of acceleration conducted in step S35 on the basis of the stored speed is reverse to that in the case of near-focus. This is because the direction of defocusing is reverse to that in the case of near-focus. In this case also, lens driving is accelerated or decelerated on the basis of the same principle. If in the case of far-focus the stored speed is 0, a positive speed is set in step S36, thereby reducing the extent of defocusing as in the above.

In this case, the change in the focal plane caused by the zooming operation is corrected by the movement of the focusing element, i.e., the lens C. The lens unit actually drives the lens C in a manner incongruous with the focusing lens movement instruction based on the AF signal processing routine of the camera unit microcomputer. If the results of this driving are directly sent to the camera unit microcomputer, the instruction value, the change in the extent of defocusing and the information on the actual movement of the lens used for the AF signal processing routine do not correspond with each other, and the extent of movement to the focusing point cannot be designated with accuracy, resulting in confusion of processing and, hence, output of a wrong drive instruction.

To avoid this malfunction, as described above, the information on the actual movement of the lens is changed in step S39 so as to correspond to the instruction from the camera unit microcomputer 115, thereby forming a dummy signal such as those of the above-described embodiments. In step S40, this signal is sent to the camera unit microcomputer.

It is thereby possible to perform the desired zooming operation in a camera system using interchangeable lenses while avoiding any confusion in the AF control on the side on the camera unit microcomputer by always correcting the AF operation.

In consequence, even if the distance to the object is changed during zooming so that the focused state is changed, there is no possibility of any malfunction of the AF operation due to a wrong signal transmitted to the AF signal processing routine.

In addition, because the direction of the lens C driving speed is stored and the AF operation is performed by controlling the acceleration or deceleration of the lens C while referring to this speed, the focusing lens can be promptly moved to the focusing point. For example, even in a case where state of control is rapidly changed from one of the plurality of V-C curves to different one of these curves, the lens C can be driven stably and promptly.

What is claimed is:

1. A camera system comprising:
   (a) focus detecting means for detecting the condition of focusing of an image of an object formed on an image forming plane by an optical system;
   (b) memory means for storing predetermined characteristics of said optical system, said memory means being arranged in said optical system;
   (c) first control means for controlling the image forming position of said optical system on the basis of information stored in said memory means;
   (d) second control means for controlling the image forming position of said optical system on the basis of an output from said focus detecting means; and
   (e) conversion means for detecting the extent of movement of the image forming position of said optical system, converting the extent of said movement into a value according to the output from said focus detecting means, and outputting the converted value.

2. A camera system according to claim 1, wherein said optical system includes a zoom lens and a focusing lens for controlling the image forming position, and the image forming position is changed with the movement of said zoom lens.

3. A camera system according to claim 2, wherein said memory means stores focusing lens drive information including driving speeds with respect to the moving positions of said zoom lens and said focusing lens.

4. A camera system according to claim 2 or 3, wherein said first control means controls driving of said focusing lens according to the movement of said zoom lens to correct the change in the image forming position with the zooming operation.

5. A camera system according to claim 4, wherein said focus detecting means outputs the extent of defocusing and the direction of defocusing of the image of the object, and said second control means corrects, on the basis of information on the extent of defocusing and the direction of defocusing, the state of driving of said focusing lens controlled by said first control means.

6. A camera system according to claim 5, wherein said second control means controls the moving position of said focusing leans by correcting, on the basis of output from said focus detecting means, the moving speed of said focusing lens determined by said first control means.

7. A camera system according to claim 6, wherein said second control means is capable of setting a plurality of focusing lens driving speeds and selects the driving speed and driving direction according to the extent of defocusing and the direction of defocusing.

8. A camera system according to claim 1, further comprising zooming discrimination means capable of outputting a signal representing whether or not said zoom lens is driven for the zooming operation.

9. A camera system according to claim 8, wherein said first and second control means operate on the basis of the output of said zooming discrimination means, and said first control means operates only when the zooming operation is performed.

10. A camera system according to claim 1, wherein the camera system comprises a lens unit and a camera body, and at least said memory means, said first and second control means and said conversion means are provided in said lens unit.

11. A camera system according to claim 10, wherein each of said lens unit and said camera body has a microcomputer and communication means for effecting communication between said microcomputers by using information including information on detection of the focus and information on the position of the focusing lens.

12. A camera system having a lens unit and a camera body to which said lens unit can be detachably attached, said camera system comprising:
   (a) focus detecting means provided in said camera body and capable of detecting the condition of focusing of an optical system of said lens unit;
   (b) first correction means provided in said lens unit and capable of correcting a change in the image forming position of said optical system caused by a predetermined operation of said optical system of said lens unit;
   (c) second correcting means for correcting the image forming position on the basis of an output from said focus detecting means; and
   (d) conversion means provided in said lens unit capable of detecting the extent of movement of the image forming position changed by said correction means, converting the extent of said movement into a value according to the output from said focus detecting means and outputting the converted value.

13. A camera system according to claim 12, wherein said optical system includes a zoom lens and a focusing lens for controlling the image forming position, and the image forming position is changed with the movement of said zoom lens.

14. A camera system according to claim 13, wherein said predetermined operation of said optical system is a zooming operation.

15. A camera system according to claim 14, wherein said correction means includes memory means for storing information on the position of said zoom lens and a plurality of items of information on driving of said focusing lens according to information on the position of said focusing lens including driving speeds.

16. A camera system according to claim 15, wherein said lens unit further includes detection means for detecting the state of driving of each of said zoom lens and said focusing lens, and said first correction means selects, on the basis of an output from said detection means, the information on driving of said focusing lens to control the driving speed of said focusing lens.

17. A camera system according to claim 16, wherein said focus detecting means outputs the extent of defocusing and the direction of defocusing of the image of the object, and said second correction means corrects, on the basis of the information on the extent of defocusing and the direction of defocusing, the moving speed of said focusing lens controlled by said first correction means to control the moving position of said focusing lens.

18. A camera system according to claim 17, wherein said second correction means is capable of setting a plurality of focusing lens driving speeds and selects the driving speed and driving direction according to the extent of defocusing and the direction of defocusing.

19. A camera system according to claim 13, further comprising zooming discrimination means capable of outputting a signal representing whether or not said zoom lens is driven for the zooming operation, said first and second correction means operate on the basis of the output from said zooming discrimination means, and said first correction means operates only when the zooming operation is performed.

20. A camera system according to claim 12, wherein each of said lens unit and said camera body has a microcomputer and communication means for effecting communication between said microcomputers by using information including information on detection of the focus and information on the position of the focusing lens.

21. A lens unit comprising:
(a) control means for changing the image forming position of an optical system according to a condition of driving of said optical system;
(b) correction means for correcting the image forming position on the basis of a signal in accordance with the condition of focusing; and
(c) output means for detecting an extent of movement of the image forming position, converting the extent of said movement into a correction value according to the condition of focusing, and outputting the correction value.

22. A lens unit according to claim 21, wherein said optical system includes a zoom lens and a focusing lens for controlling the image forming position, and said state of driving corresponds to a zooming operation, and the image forming position of said optical system is changed with the movement of said zoom lens.

23. A lens unit according to claim 22, further comprising memory means for storing information on driving of said focusing lens including driving speeds with respect to the moving positions of said zoom lens and said focusing lens.

24. A lens unit according to claim 23, wherein said control means reads out driving speed information from said memory means on the basis of the movement of said zoom lens, drives said zoom lens and controls the position of said zoom lens so as to correct the change in the image forming position caused by the zooming operation.

25. A lens unit according to claim 24, wherein said correction means controls the state of driving of said focusing lens controlled by said control means on the basis of the extent of defocusing and the direction of defocusing.

26. A lens unit according to claim 25, wherein said correction means controls the moving position of said focusing lens by correcting the moving speed of said focusing lens determined by said control means.

27. A lens unit according to claim 26, wherein said correction means is capable of setting a plurality of focusing lens driving speeds and selects the driving speed and driving direction according to the extent of defocusing and the direction of defocusing.

28. A camera system according to claim 21, wherein said control means operates only when the zooming operation is performed.

29. A camera system according to claim 21, further comprising communication means for communication with a microcomputer of a camera body by using information including information on detection of the focus and information on the position of the focusing lens.

30. A lens unit having a zoom lens and a focusing lens wherein the image forming position is changed according to the condition of driving of said zoom lens, said lens unit comprising:
(a) control means for detecting the driving positions of said zoom lens and said focusing lens and setting a driving speed of said focusing lens;
(b) correction means for correcting, according to the condition of focusing, the driving speed of said focusing lens set by said control means; and
(c) calculation means for detecting the extent of movement of said focusing lens and calculating and outputting a component of information on the movement of said focusing lens based on the condition of focusing.

31. A lens unit according to claim 30, further comprising a memory for storing information on the focusing lens driving speed based on the positions of said zoom lens and said focusing lens.

32. A lens unit according to claim 31, wherein said control means selects the corresponding driving speed from said memory according to the positions of said zoom lens and said focusing lens.

33. A lens unit according to claim 30 or 32, wherein said correction means corrects, on the basis of information on the extent of defocusing and the direction of defocusing, the focusing driving speed determined by said control means to focus said focusing lens.

34. A lens unit according to claim 30, wherein said control means operates when a zooming operation is performed.

35. A lens unit according to claim 34, wherein said calculation means converts the extent or direction of actual movement of said focusing lens into a value representing the extent or direction of movement of said focusing lens corresponding to the state of focusing when the zooming operation is not performed.

36. A lens unit, comprising:
(a) a driving part arranged in said lens unit;

(b) first control means for driving said driving part on the basis of a control information fed from a camera side;

(c) second control means for driving said driving part on the basis of an information stored in said lens unit; and (d) output means for detecting a driving state of said driving part, for converting an information indicating said driving state into a driving state of said driving part on the basis of a control information fed from said camera side and for outputting the converted information to said camera side.

37. A lens unit according to claim 36, wherein said driving part is a part for driving a focusing lens.

38. A lens unit according to claim 37, wherein said lens unit includes a zoom lens and said stored information is an information relating to a position of a focal plane which varies in accordance with a movement of said zoom lens.

39. A lens unit according to claim 38, wherein said stored information is an information relating to a driving speed of said focusing lens depending upon moving positions of said zoom lens and said focusing lens.

40. A lens unit according to claim 36, wherein said first control means and said second control means comprise microcomputers and said stored information is stored in a ROM contained in the lens unit.

41. A lens unit detachably mounted in a camera body, comprising:

(a) a driving part disposed in said lens unit;

(b) control means for driving said driving part on the basis of a control information fed from the camera side and for driving said driving part on the basis of a predetermined characteristic stored in storing means disposed in said lens unit; and (c) information converting and outputting means for detecting a driving state of said driving part, for converting an information indicating said driving state into a predetermined information adaptable to a control algorithm at the camera side.

42. A lens unit according to claim 41, wherein said driving part includes a focusing lens and means for driving the same.

43. A lens unit according to claim 42, wherein said lens unit includes a zoom lens and means for driving the same and wherein said storing means stores an information for driving said focusing lens to correct a change of a focal plane owing to an operation of said zoom lens and wherein said control means reads out a driving information depending upon a position of said zoom lens and a position of said focusing lens and drives said focusing lens.

44. A lens unit according to claim 43, wherein the control information fed from the camera side is a signal relating to a focusing state, and said control means operates said driving means on the basis of a focus control information transmitted from the camera side at the same time with the driving on the basis of the driving information stored in said storing means, thereby driving the focusing lens.

45. A lens unit according to claim 44, wherein said information converting and outputting means is arranged to detect an actual amount of movement of said focusing lens, to convert the actual amount of movement into an amount of movement of said focusing lens in accordance with a focus control information fed from the camera side and to transmit the converted amount to said camera side.

46. A camera system comprising:

(a) a driving part disposed in a lens unit;

(b) camera side control means for transmitting a control information for controlling said driving part disposed in the lens unit;

(c) control means disposed in said lens unit, for selectively or simultaneously executing a first control algorithm for driving said driving part on the basis of said control information and/or a second control algorithm for driving said driving part on the basis of the stored information stored in said lens unit; and (d) output means for detecting a driving state of said driving part, for converting an information indicating said driving state into a form adaptable to processing operation of said camera side control means and for outputting the converted information to the camera side.

47. A camera system according to claim 46, wherein said driving part includes a focusing lens and means for driving the same.

48. A camera system according to claim 47, wherein said lens unit includes a zoom lens and means for driving the same, wherein said stored information includes an information for driving said focusing lens to correct a variation of a focal plane caused by an operation of said zoom lens and wherein said control means is arranged to read out a driving information depending upon a position of said zoom lens and a position of said focusing lens from said storing means and to drive said focusing lens.

49. A camera system according to claim 48, wherein the control information fed from the camera side is a signal relating to a focusing state and said control means is arranged to operate said driving means on the basis of a focus control information transmitted from the camera side at the same time with driving based on the driving information stored in said storing means, thereby driving the focusing lens to effect focus control.

50. A camera system according to claim 49, wherein said output means is arranged to detect an actual amount of movement of said focusing lens, to convert the actual amount of the movement into an amount of movement of said focusing lens depending upon a focus control information fed from the camera side and to transmit the converted amount to the camera side.

51. A lens unit, comprising:

(a) a focusing lens;

(b) a zoom lens;

(c) control means for enabling execution of processing for controlling driving of said focusing lens on the basis of a focus control information fed from focus detecting means at the camera side and for controlling driving of said focusing lens on the basis of a stored information previously stored in a memory disposed in said lens unit to correct a focal plane which varies depending upon the operation of said zoom lens; and (d) output means for detecting a moving state of said focusing lens, for converting an information indicating said moving state into a form adaptable for transmission to the focus detecting means at the camera side and for outputting the converted information.

52. A lens unit according to claim 51, wherein said stored information includes a driving information for said focusing lens to correct a variation of a focal plane depending upon the operation of said zoom lens and wherein said control means is arranged to read out the driving information depending upon a position of said zoom lens and a position of said focusing lens from said memory and to drive said focusing lens.

* * * * *